(12) United States Patent
Ruetsch

(10) Patent No.: US 7,269,542 B2
(45) Date of Patent: Sep. 11, 2007

(54) SYSTEM AND METHOD FOR DETERMINING A CACHE OPTIMIZED ORDERING OF CELLS IN AN UNSTRUCTURED GRAPH

(75) Inventor: Gregory R. Ruetsch, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 738 days.

(21) Appl. No.: 10/271,508

(22) Filed: Oct. 16, 2002

(65) Prior Publication Data
US 2004/0107312 A1 Jun. 3, 2004

(51) Int. Cl.
*G06F 9/45* (2006.01)
(52) U.S. Cl. ............... 703/22; 703/2; 711/170; 717/151; 717/156
(58) Field of Classification Search ............ 703/22, 703/2; 711/170; 717/153, 151, 156
See application file for complete search history.

(56) References Cited

U.S. PATENT DOCUMENTS 6,175,957 B1 * 1/2001 Ju et al. ................... 717/156

OTHER PUBLICATIONS

Trishul M. Chilimbi et al., "Making Pointer-Based Data Structures Cache Conscious", 2000, IEEE, pp. 67-74.*
Chen Ding and Ken Kennedy, "Improving Cache Performance in Dynamic Applications through Data Computation Reorganization at Run Time", 1999, ACM, pp. 229-241.*
Murali Annavaram et al., "Data Prefetching by Dependence Graph Precomputation", 2001, IEEE, pp. 52-61.*
Thomas Kistler and Michael Franz, "Automated Data-Member Layout of Heap Objects to Improve Memory-Hierarchy Performance", 2000, ACM, pp. 1-16.*
Josep Torrellas, Chun Xia, and Russel Daigle; "Optimizing the Instruction Cache Performance of the Operating System"; 1998; IEEE Transactions on Computers; vol. 47, No. 12; pp. 1363-1381.*
Publication entitled "Improving Fine-Grained Irregular Shared-Memory Benchmarks by Data Reordering," by Y. Charlie Hu et al., Rice University, 2000 IEEE.
Publication entitled "Memory Hierarchy Management for Iterative Graph Structures," by Ibraheem Al-Furaih et al., University of Florida. 1998 ACM.

* cited by examiner

Primary Examiner—Paul Rodriguez
Assistant Examiner—Jason Proctor
(74) Attorney, Agent, or Firm—Park, Vaughan & Fleming LLP

(57) ABSTRACT

One embodiment of the present invention provides a system and method for determining a cache optimized ordering of cells in an unstructured graph. Cells bounding a region defined along a portion of a stored logically-defined grid are identified and each cell is added into an element of a level set array block in order of traversal through the region along the boundary. The level set array block is reordered for each additional cell in the data object that is contiguous to at least one such cell added previously to the level set array block. Each such additional cell is added into an element of the level set array block. Each cell remaining in the data object independent of any element in the level set array block is iteratively added.

19 Claims, 13 Drawing Sheets

US 7,269,542 B2

SYSTEM AND METHOD FOR DETERMINING A CACHE OPTIMIZED ORDERING OF CELLS IN AN UNSTRUCTURED GRAPH

BACKGROUND

1. Field of the Invention

The present invention relates in general to unstructured grid cell ordering, and, in particular, to a system and method for determining a cache optimized ordering of cells in an unstructured graph.

2. Related Art

Certain classes of problems, particularly simulations in physics and engineering, operate on large numeric data sets requiring the decomposition of a physical space or the division of a model into a grid or mesh (hereinafter "grid") of individual quadrilateral elements or cells (hereinafter "cells") expressed in a multi-dimensional problem space. For example, calculating the stress on a piece of paper requires the modeling of the paper surface as a grid of individual cells with each cell storing a load factor and other data. The stress calculated at any given point in the grid depends on the load factors stored in the cells adjacent to the load factor stored in the cell being measured.

Physically, the contents of the cells are stored in serial order in either structured memory arrays with cells organized into repeating patterns occurring at regular intervals or unstructured memory arrays with irregularly-spaced cells occurring aperiodically. Nearest neighbor and related types of operations performed on a data set represented by an unstructured memory array generally perform poorly when executed in a default ordering.

Providing efficient solutions to solving problems requiring physically contiguous data access between elements is strongly dependent on processor and memory access speed. Presently, increases in processor speed have greatly outpaced increases in memory access speed. The disparity between processor versus memory access speed has created a performance bottleneck, which has progressively worsened as the disparity widened. Recently, computer systems have trended towards a heavier reliance on hierarchically-structured memory architectures to alleviate the memory access bottleneck problem.

Fundamentally, caches transiently stage data and instructions in a limited-sized but high-speed memory array. Each cache stores a subset of the data currently loaded into the main memory. Due to the limited cache capacity, individual cache words must be replaced when necessary to accommodate other subsets of the main memory that require access.

Data elements stored in unstructured data sets generally lack a regular and periodic pattern of organization. Typically, individual cells are assigned to elements of a memory array in order of traversal through the unstructured data set. The ordering of memory array elements storing cells from an unstructured data set can be critical to ensuring optimal cache performance and an arbitrary ordering of cells can destroy any spatial or temporal locality. For example, spatially local, non-physically contiguous cells could be assigned to memory array elements that, when loaded into one or more caches, span multiple, disparate cache lines and result in poor cache performance. To alleviate the problem of arbitrary, non-physically contiguous ordering, the memory array elements can be reordered to improve data locality prior to execution of problem-solving code.

In the prior art, the two main classes of reordering programs use either a breadth first search or a space filling curve approach, such as described in A. George et al., "Computer Solution of Large Sparse Positive Definitive Systems," Comp. Math., Prentice-Hall (1981), the disclosure of which is incorporated by reference. However, the breadth first search approach does not require that cells within an iteration of a front or level set be contiguous and, consequently, near-diagonal lines are not formed in an adjacency matrix of the cells. As well, the space filling curve approach does not try to establish a regular access pattern between physically adjacent cells, which appear on cache lines.

Yet a further approach to providing improved cache data locality through memory array element reordering is described in I. Al-Furaih and S. Ranka, "Memory Hierarchy Management for Iterative Graph Structures," Proceedings of the 1998 International Parallel Processing Symposium/Symposium on Parallel and Distributed Processing, (1998), pages 298-302, the disclosure of which is incorporated by reference. Algorithms for obtaining a mapping table are surveyed and two methods for reordering two iterative graphs structures are provided. In the first method, independent reordering, each of two graphs are reordered independent of each other based on the interaction between nodes. In the second method, coupled reordering, each graph is reordered using self-interactions and interactions with other subgraphs. Although empirically increasing overall performance, the approach fails to provide an efficient reordering of nearest neighboring cells from unstructured data sets for optimization of hierarchical cache structures.

Yet a further prior art approach to providing improved data cache locality is described in W. Z. Hu et al., "Improving Fine-Grained Irregular Shared-Memory Benchmarks by Data Reordering," Proceedings, Supercomputing 2000, Nov. 4-10, 2000, IEEE Computer Society, ISBN 0-7803-9802-5, 2000 the disclosure of which is incorporated by reference. Two data reordering methods are provided, each consisting of two phases. During the first phase, a sorting key is constructed for each object and the keys are sorted to generate a rank. During the second phase, the objects are reordered according to generated rank. Although empirically increasing overall performance, the approach fails to provide an efficient reordering of nearest neighboring cells from unstructured data sets for optimization of hierarchical cache structures.

Therefore, there is a need for an approach to providing effective reordering of memory array elements storing data values from data object cells in an unstructured graph, such as a numeric data set, for improving hierarchical cache performance and to provide increased spatial and temporal data locality.

There is a further need for an approach to providing an efficient organization of data cells from a structured or unstructured grid stored in a memory array to efficiently solve nearest neighbor type problems without requiring modification of the underlying operations.

SUMMARY

One embodiment of the present invention provides a system and method for determining a cache optimized ordering of cells in an unstructured graph. A bounding module identifies cells laying on a specified portion of a boundary of a logically-defined grid for a stored unstructured graph. A reordering module adds each identified cell in order of traversal along the specified portion of the boundary into an element of a provisional level set array block, and inserts one or more further cells between each sequential pair of cells, which are not contiguously-located in the logically-defined grid, into an element of the provisional level set array block. Each further cell is located contiguous to at least one of the sequential pair of cells in the logically-defined grid. An iteration module iteratively identifies, adds and inserts each cell remaining in the logically-defined grid.

In a variation on this embodiment, the data object includes a shape having two dimensions.

In a variation on this embodiment, the data object includes a shape having more than two dimensions. A searching module finds each such additional cell in the data object that is contiguous in each dimension to the at least one such cell added previously to the level set array.

In a variation on this embodiment, a preordering module divides the data object into the cells with each such cell having a closed shape and shares a common edge with at least one other such cell in the data object.

In a variation on this embodiment, a memory allocation module allocates the level set array with a set of the elements at least equal to the number of the cells in the data object.

In a variation on this embodiment, the data object includes a structured polygon logically divided by regularly-spaced cells.

In a variation on this embodiment, the data object includes an unstructured polygon logically divided by irregularly-spaced cells.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs). However, this does not include computer instruction signals embodied in a transmission medium (with or without a carrier wave upon which the signals are modulated).

Glossary

The terms listed below are used throughout this document and, unless indicated otherwise, are assigned meanings as follow:

| | |
|---|---|
| Model: | A computer-generated file, often generated by a computer-aided design (CAD) program, storing information defining a problem space with each point in the problem space expressed as a data object. For example, a data object in a typical model would contain connectivity information, coordinates of cell centers, information about which cells form a boundary, and other related data. |
| Grid: | A logically-defined division of a model into individual discrete and contiguous cells. |
| Graph: | A computer-generated file, often generated by a computer-aided design (CAD) program or by a separate gridding or meshing program, storing connectivity information identifying the cells neighboring each cell within a grid. A structured graph has cells occurring at regular-spaced intervals. An unstructured graph has cells occurring aperiodically. |
| Reordering Array: | A computer-generated file, often generated by a reordering program, storing a mapping from an original cell ordering to a new cell ordering. |

Filament Reordering System

Figure 1:
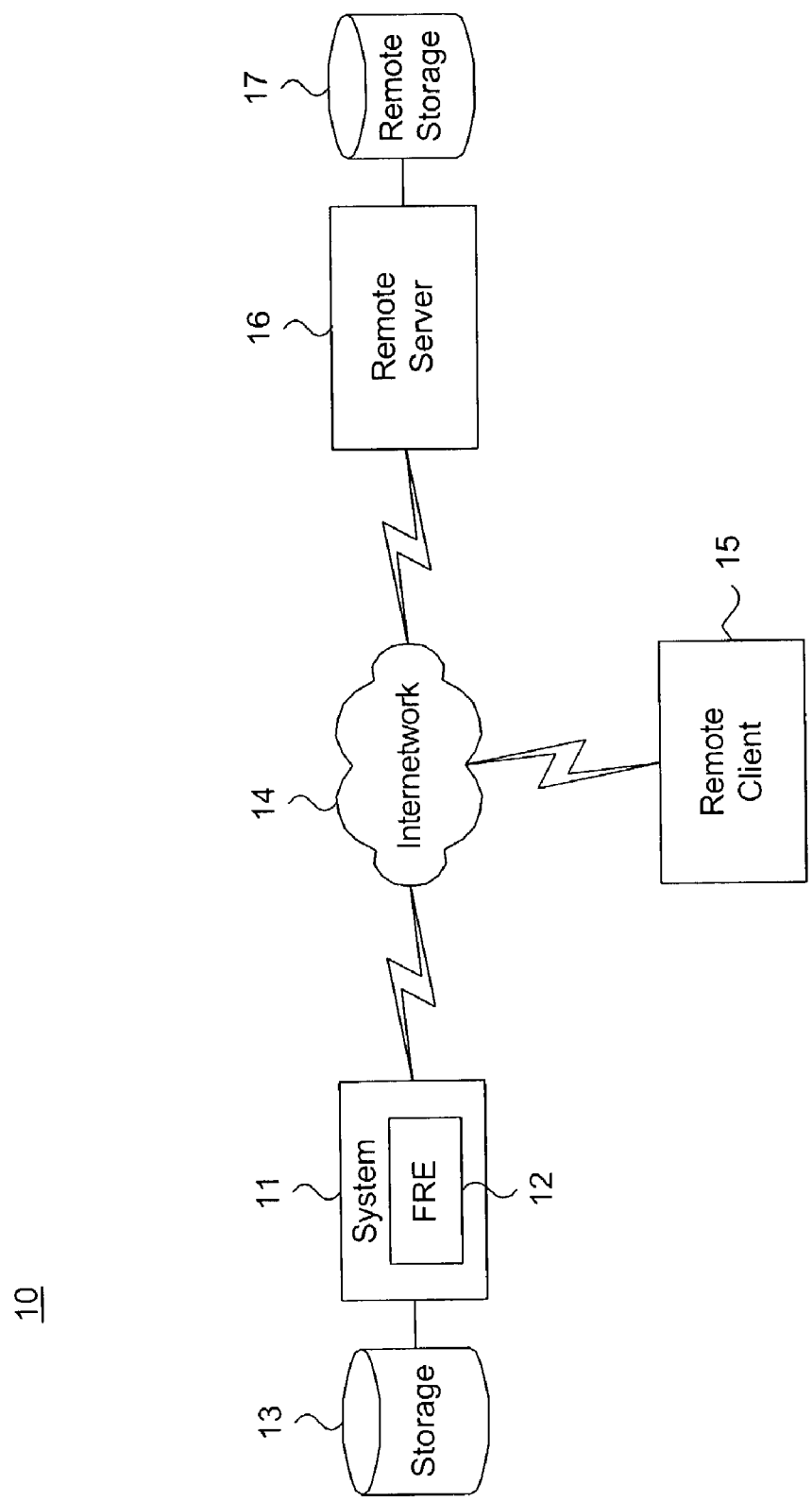
FIG. 1 is a block diagram showing a system for determining a cache optimized ordering of cells in an unstructured graph in accordance with an embodiment of the present invention.

FIG. 1 is a block diagram showing a system for determining a cache optimized ordering of cells in an unstructured graph 11 in accordance with an embodiment of the present invention. The system 11 executes program code, which can include program code directed at solving a specific problem, or can be a filament reordering engine (FRE) 12 for reordering elements for cache-friendly run time behavior, as further described below with reference to FIG. 3. Problem-solving code is outside the scope of the present discussion. The system 11 includes an attached storage device 13 for persistently storing information.

The system 111 executes program code, such as the filament reordering engine 12, as a stand-alone computer system. Alternatively, the system 11 can communicate with a remote client 15 via an internetwork 14, such as the Internet, or any other form of wide-area or local-area network or combinations thereof. The remote client 15 can also remotely executes the program code as a remote process, as is known in the art. Similarly, the server 11 can communicate with a remote server 16 via the internetwork 14. The remote server 16 includes an attached remote storage device 17 for remotely persistently storing information. Other configurations of system components and network topologies are possible, as would be recognized by skilled in the art.

Memory Organization

Figure 2:
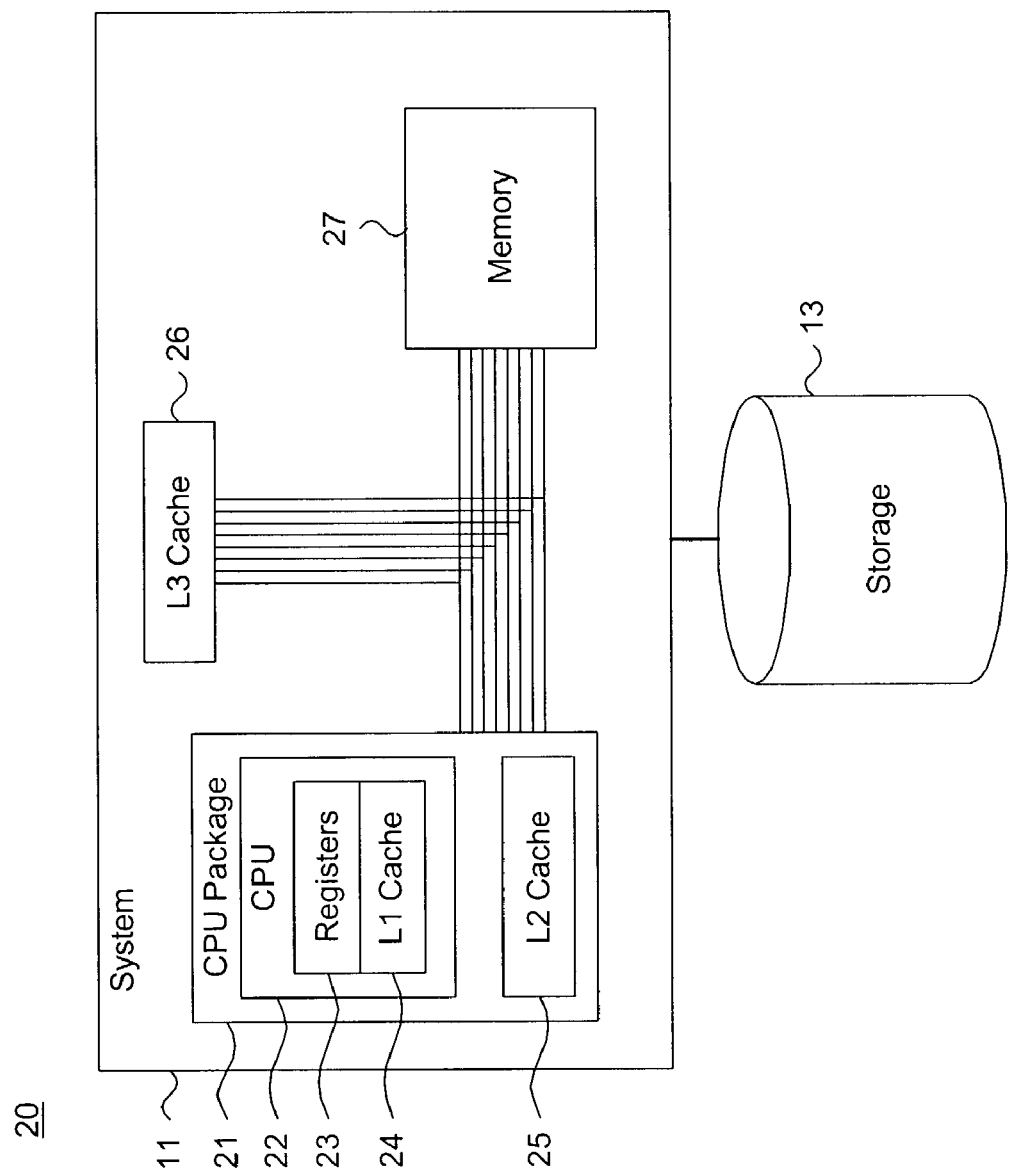
FIG. 2 is a block diagram showing the memory organization of the system of FIG. 1.

FIG. 2 is a block diagram showing the memory organization of the system 11 of FIG. 1. The system 11 includes a central processing unit (CPU) 22, incorporated as part of a CPU package 21, and a random access memory 27. The system 11 executes program code, as is known in the art. By way of illustration, the program code includes the filament reordering engine 12, as further described below with reference to FIG. 3, and computer-aided design (CAD) programs. The memory 27 stages information retrieved from the attached storage device 13 upon request of the CPU 22. For simplicity, other system components, such as a keyboard controller, graphics controller, and disk controller, have been omitted for clarity and one skilled in the art would appreciate that other components would be necessary to practice a system 11 as is known in the art.

The system 11 includes a hierarchically-structured memory architecture, consisting of, from top-down, the individual memory registers 23 of the CPU 22, a level one (L1) cache 24, level two (L2) cache 25, and level three (L3) cache 26. The L1 cache 23 is an on-chip cache included as part of the CPU 22. The L2 cache 25 is an off-chip cache included as part of the CPU package 21. The L3 cache 26 is included as a chip set separate from the CPU package 21.

During program execution, the CPU 22 retrieves data and instructions stored in the memory 27. If a requested item is not present in a register 23, a memory request is generated and sent to the memory 27. Each cache intercepts the memory request and attempts to provide the requested memory item. An unsuccessful access to a cache is known as a cache miss and requires retrieval of the requested item from a next level cache or from the memory 27. A successful access to a cache is known as a cache hit and provides significantly faster memory access for those data and instructions transiently staged in the cache. The hierarchical structuring of the caches allows a graceful degradation in cache miss processing by attempting retrieval from progressively slower caches before finally resorting to retrieving the requested item from the memory 27.

Software Modules

Figure 3:
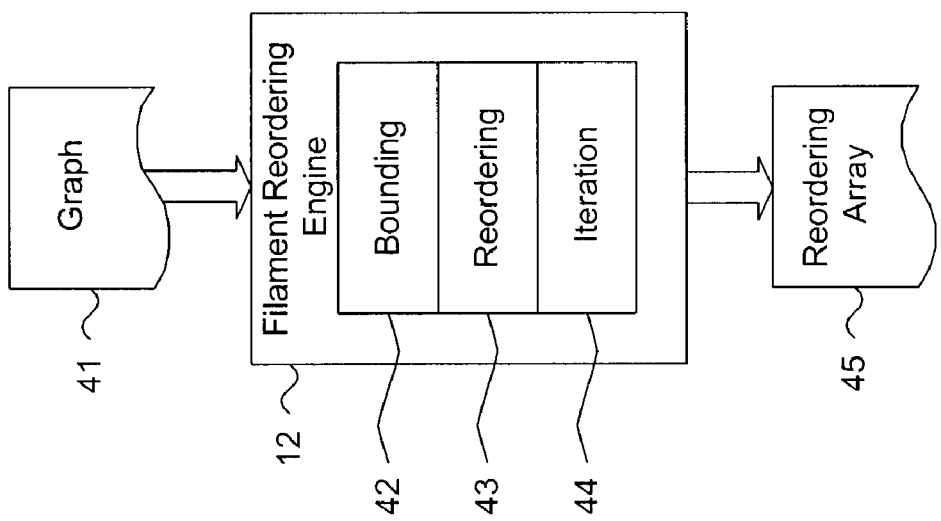
FIG. 3 is a block diagram showing the software modules implementing the filament reordering engine used by the system of FIG. 1.

FIG. 3 is a block diagram showing the software modules implementing the filament reordering engine 12 used by the system 11 of FIG. 1. The filament reordering engine receives a graph 41 storing connectivity information as an input and generates a reordering array 45 as an output. The filament reordering engine 12 performs a sequence of process steps, as further described below with reference to FIG. 14.

The graph 41 contains the connectivity information for a logically-defined grid organized by cell in a default ordering. For example, a graph 41 representing the ordering 86 for the unstructured grid 85 in FIG. 7, further described below, could contain the following information:

| | |
|---|---|
| 1: | 2 |
| 2: | 1 3 4 |
| 3: | 2 5 |
| . | . |
| . | . |
| . | . | where cell '2' is identified as a neighbor of cell '1,' cells '1,' '3,' and '4' are identified as neighbors of cell '2,' cells '2' and '5' are identified as neighbors of cell '3,' and so forth. The graph 41 could contain connectivity information for either a structured or unstructured grid. Other organizations of connectivity information are possible, as would be recognized by one skilled in the art.

The filament reordering engine 12 accepts the graph 41 as an input and performs a filament reordering of the cells, which is stored as an output in the reordering array 45. The reordering array 45 can be used as input by a third party application, such as a CAD program, to reorder the connectivity information stored in the graph 41 and provides an ordering, which when applied to the connectivity information stored in the graph 41, results in cache optimized behavior, as further described below with reference to FIGS. 11A-D. Thereafter, problem-solving code using the reordered graph 41 as input will benefit from increases in performance due to improved cache behavior.

The filament reordering engine 12 includes three principal modules: bounding 42, reordering 43, and iteration 44. The bounding module 42 identifies a region, or filament, along a portion of a boundary of the grid at which to begin the process of filament reordering. The reordering module 43 forms level set array blocks and reorders elements within each level set array block, such that sequential elements correspond to physically contiguous cells in the grid. The iteration module 44 repeats the processes performed by the bounding module 42 and reordering module 43 for successive level set array blocks until a complete filament reordering has been performed.

Structured Grid

Figure 4:
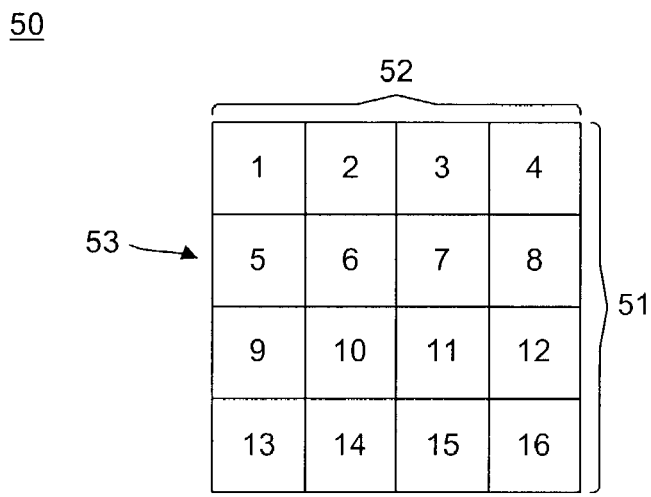
FIG. 4 is a block diagram showing, by way of example, a structured grid.

FIG. 4 is a block diagram showing, by way of example, a structured grid 50. Although a two-dimensional grid decomposed into quadrilateral elements is shown here, the structured grid 50 could be any form of polygon or closed shape having individual cells occurring in a regular pattern, or could be any other form of multi-dimensional data model, as would be recognized by one skilled in the art. The structured grid 50 includes four rows 51 and four columns 52 and is logically divided by regularly-spaced cells 53.

Structured Grid Ordering

Figure 5:
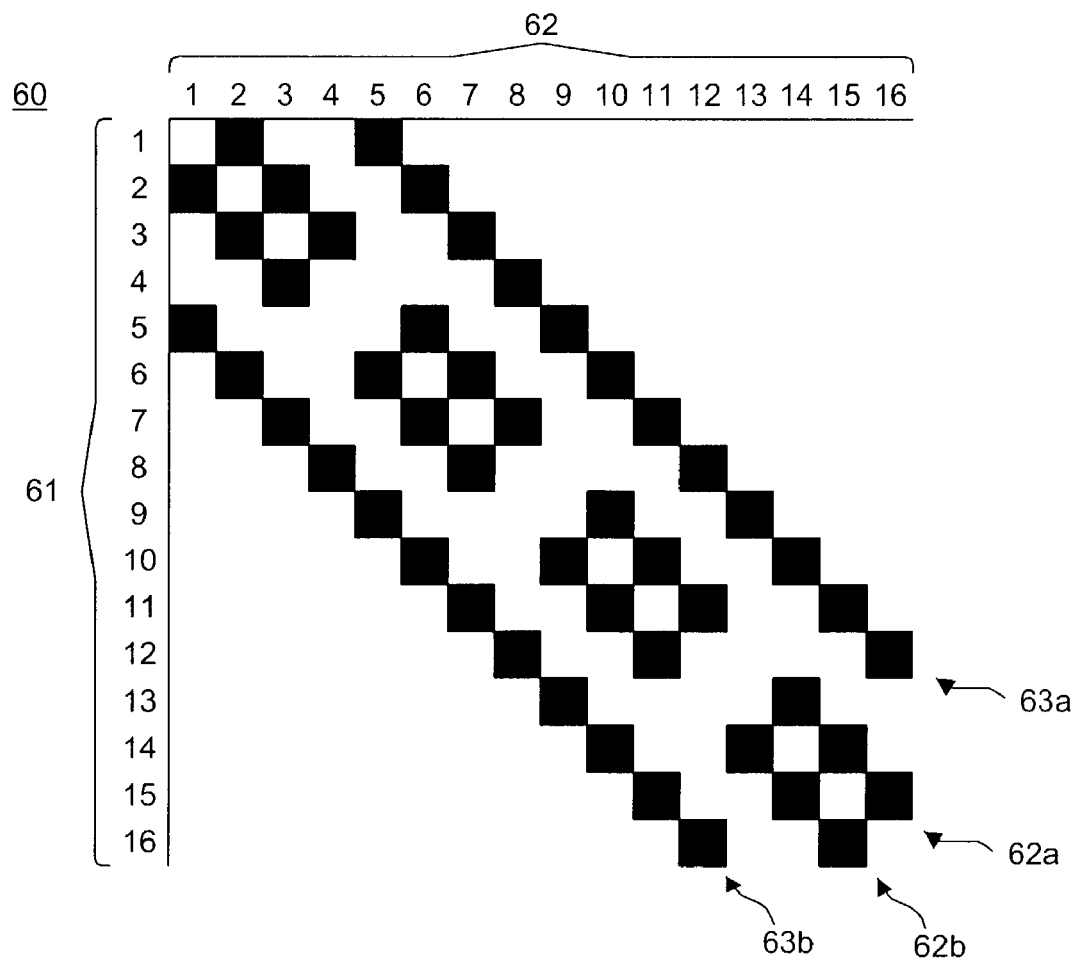
FIG. 5 is a graph showing, by way of example, an adjacency matrix formed from the cells of the structured grid of FIG. 4.

FIG. 5 is a graph showing, by way of example, an adjacency matrix 60 formed from the cells 53 of the structured grid 50 of FIG. 4. The adjacency matrix 60 identifies the nearest neighboring cells of each cell listed in row 61 and column 62. For instance, cell '7' has row-wise nearest neighbors of cells '6' and '8' and column-wise nearest neighbors of cells '3' and '11.' The entries in the adjacency matrix 60 for cell '7' in the seventh row 61 and in the seventh column 62 reflects the these nearest neighbor relationships.

For regularly-spaced cells in a structured graph, the nearest neighbor relationships form a regular pattern when identified in the adjacency matrix, which includes two near-diagonals 62*a,b* accompanied by two far-diagonals 63*a,b*.

Unstructured Grid

Figure 6:
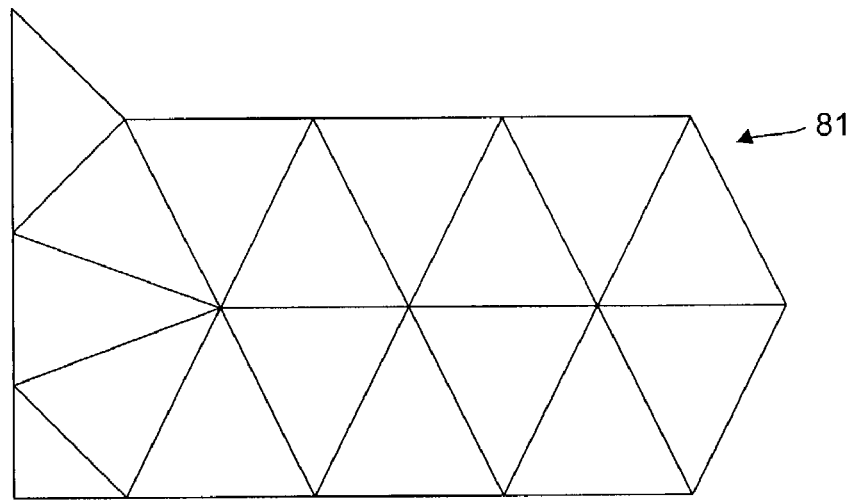
FIG. 6 is a block diagram showing, by way of example, an unstructured grid.

FIG. 6 is a block diagram showing, by way of example, an unstructured grid 80. Although shown as a two-dimensional polygon, the unstructured grid could be other forms of closed shape or polygon having individual contiguously neighboring cells occurring at aperiodic intervals, or could be any form of multi-dimensional data model, as would be recognized by one skilled in the art. An unstructured grid 80 defines a polygon logically divided by irregularly-spaced cells 81. Unlike the cells 53 of the structured grid 50 (shown in FIG. 4), the cells 81 of the unstructured grid 80 lack a regularly defined pattern of occurrence and are not organized at regular intervals amenable to cache-friendly behavior. Consequently, the order in which the cells 81 are arranged in the level set array block is critical to providing optimal cache performance, particularly when accessed during the execution of nearest neighbor type operations.

Breadth First Search Ordering

Figure 7:
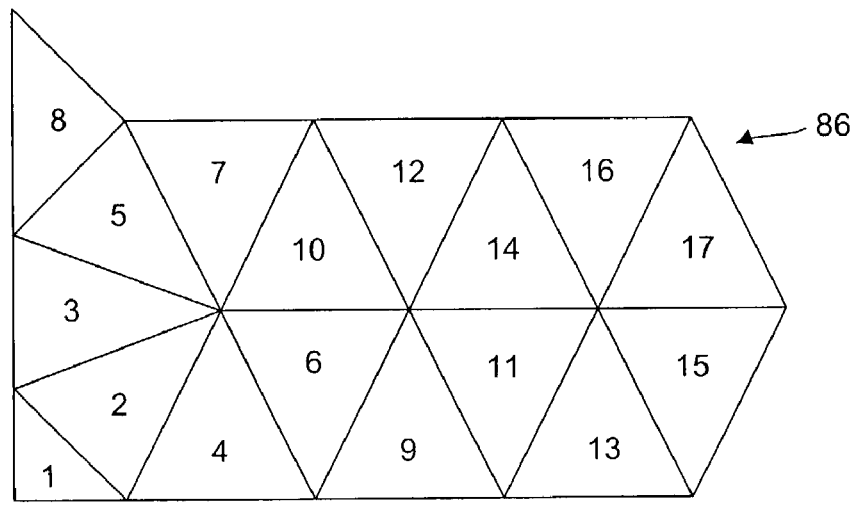
FIG. 7 is a block diagram showing, by way of example, a breadth first search ordering of the unstructured grid of FIG. 6.

FIG. 7 is a block diagram showing, by way of example, a breadth first search ordering 86 of the unstructured grid 80 of FIG. 6. The breadth first search ordering technique is described in A. George et al., Ibid. In the breadth first search ordering technique, a first cell in the unstructured grid 85 is selected, here, the lower left hand cell. Those cells in the unstructured grid contiguous to the selected cell are identified. Subsequently, each cell contiguous to a previously-identified cell is selected and the process repeated until all cells in the unstructured grid 85 have been picked. Selection proceeds as a wave front progressing from the initially-selected cell and has a tendency to provide an ordering not optimally suited to nearest neighbor type operations.

Figure 8:
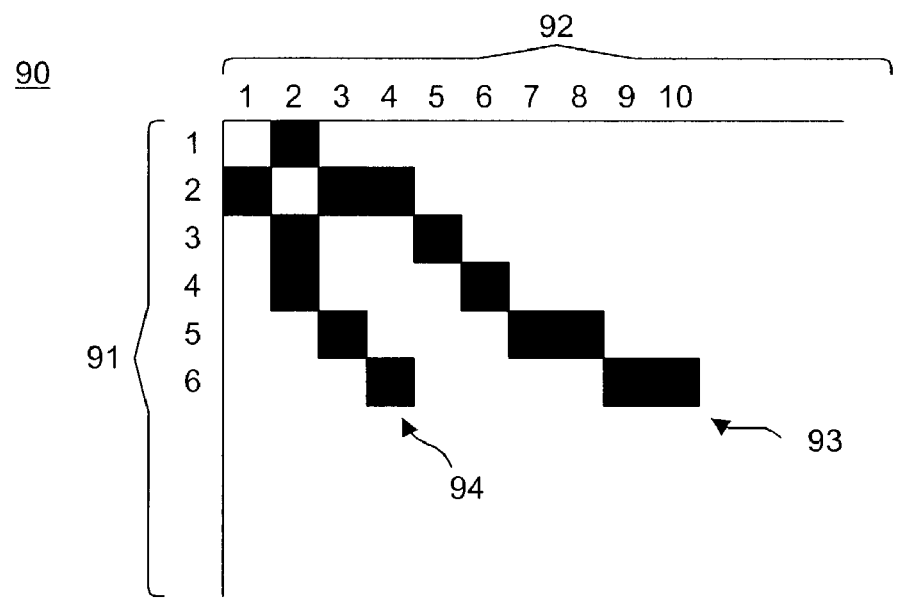
FIG. 8 is a graph showing, by way of example, an adjacency matrix formed from the cells of the unstructured grid of FIG. 7.

FIG. 8 is a graph showing, by way of example, an adjacency matrix 90 formed from the cells 86 of the unstructured grid 85 of FIG. 7. As above, the adjacency matrix 90 includes a set of rows 91 and columns 92 reflecting the nearest neighboring cells for the unstructured grid 85 based on the breadth first search ordering. However, the nearest neighbor relationships tends to form as two far-diagonals 93, 94 with an unequal distribution of nearest neighboring cells distributed between the two diagonals. The adjacency matrix has a widening access pattern that indicates memory accesses lacking a constant stride.

Breadth First Search From Boundary Ordering

Figure 9:
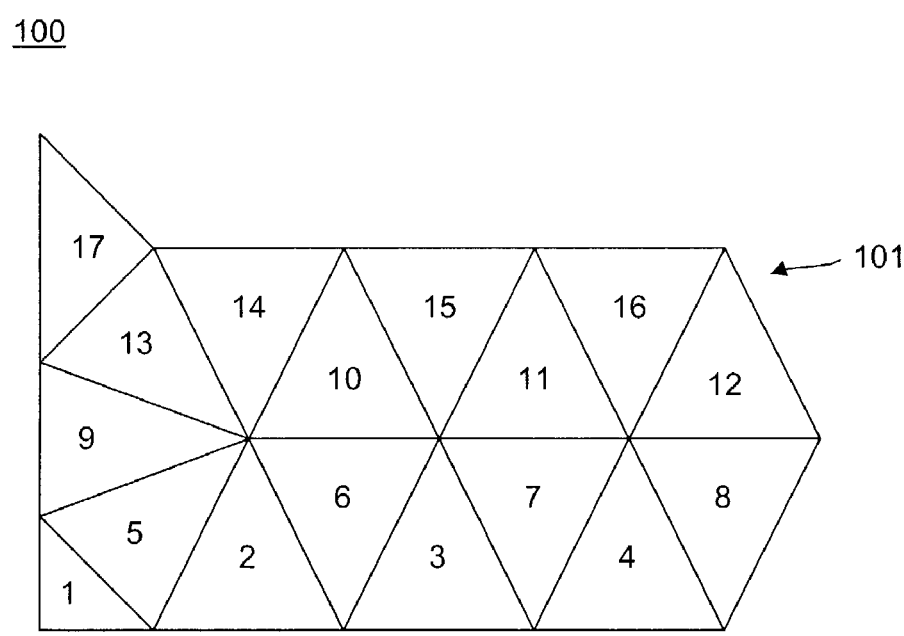
FIG. 9 is a block diagram showing, by way of example, a related breadth first search from boundary ordering of the unstructured grid of FIG. 6.

FIG. 9 is a block diagram showing, by way of example, a related breadth first search from boundary ordering 101 of the unstructured grid 80 of FIG. 6. In the breadth first search from boundary ordering technique, an initial boundary is defined along an edge of the unstructured grid 100 and those individual cells along the boundary are identified. Those cells in the unstructured grid contiguous to each selected cell are next identified. Subsequently, each cell contiguous to a previously-identified cell is selected and the process repeated until all cells in the unstructured grid 100 have been picked. Selection, therefore, progresses from the set of initially-selected cells along the boundary and has a tendency to provide an ordering not optimally suited to nearest neighbor type operations.

Figure 10:
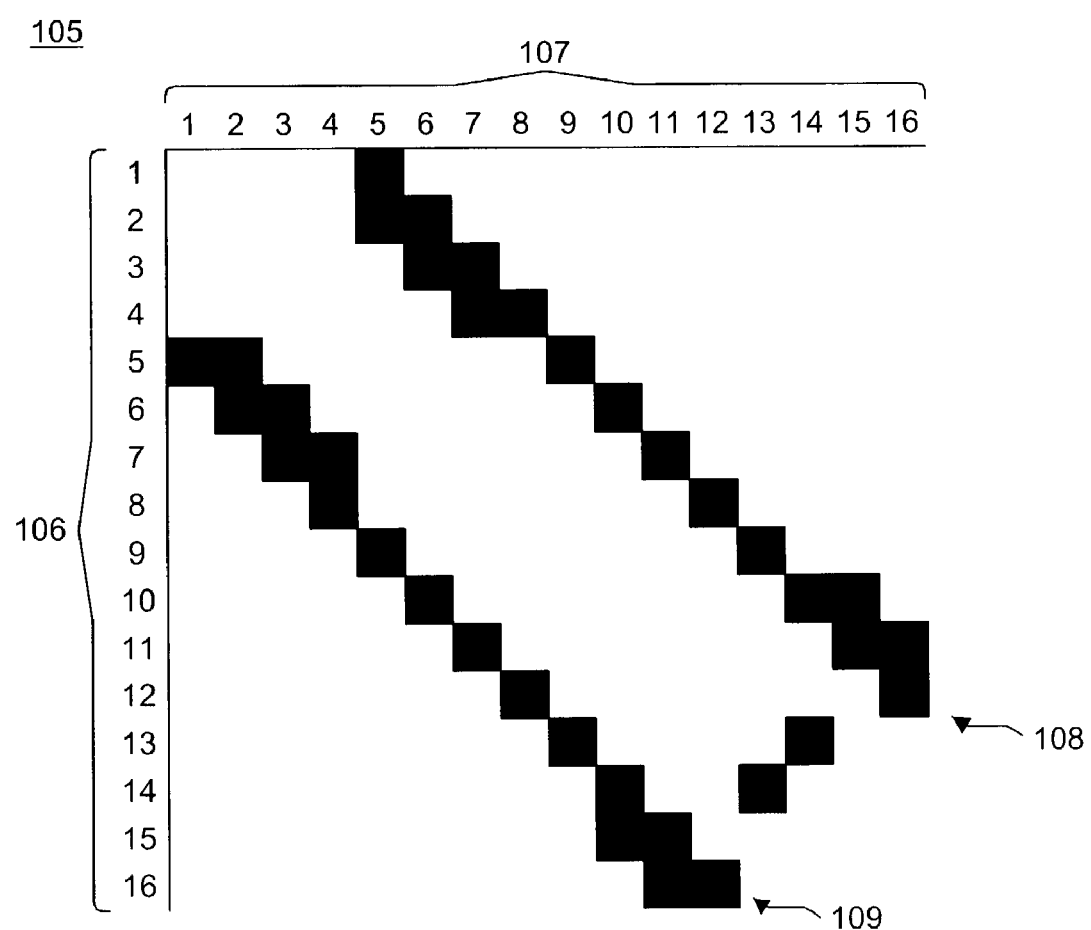
FIG. 10 is a graph showing, by way of example, an adjacency matrix formed from the cells of the unstructured grid of FIG. 9.

FIG. 10 is a graph showing, by way of example, an adjacency matrix 105 formed from the cells 101 of the unstructured grid 100 of FIG. 9. As above, the adjacency matrix 105 includes a set of rows 106 and columns 107 reflecting the nearest neighboring cells for the unstructured grid 100 based on the breadth first search from boundary ordering. However, as with the breadth first search ordering technique, the nearest neighbor relationships tend to form as two far-diagonals 108, 109 with an unequal distribution of nearest neighboring cells distributed between the two diagonals. The poor distribution is reflected in the ordering of cache lines for the unstructured grid 100.

Filament Reordering

FIGS. 11A-D are block diagrams showing, by way of example, a progressive filament reordering of the unstructured grid 80 of FIG. 6. Briefly, filament reordering involves first defining a portion of an initial boundary and identifying cells in a region, or filament, along the boundary. After these cells along the boundary are stored in an provisional array, the cells are ordered and additional cells are added, such that traversal through the provisional array results in a traversal through contiguous cells in the model. Upon completion, this provisional array becomes the first level set block. A new boundary is formed at the edge of the level set block, and the process is repeated to define new level sets until all cells in the model are represented in a level set.

Figure 11A:
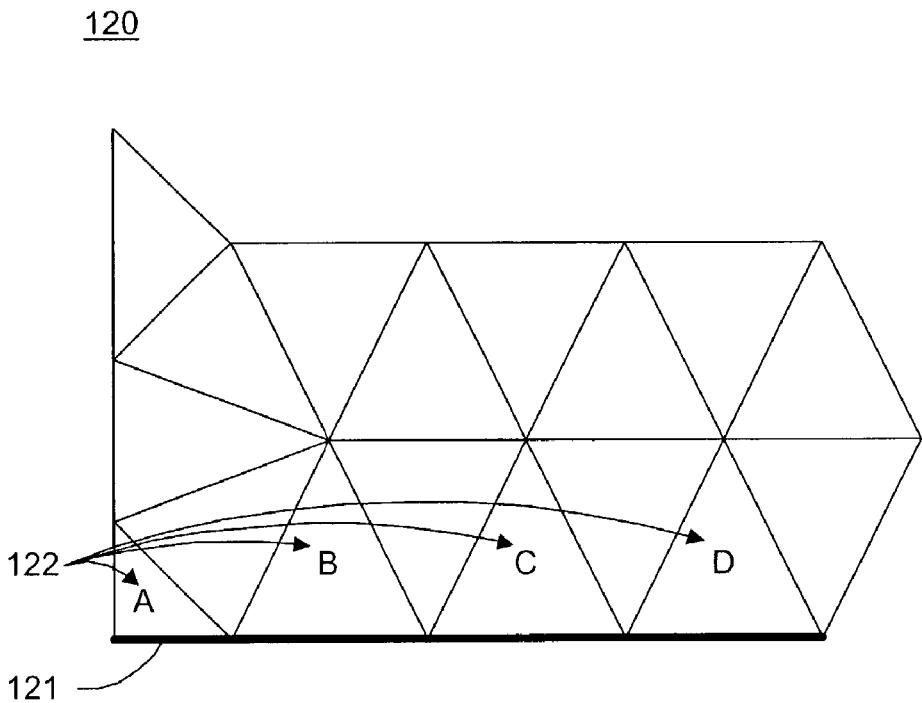
FIGS. 11A-D are block diagrams showing, by way of example, a progressive filament reordering of the unstructured grid of FIG. 6.

Referring first to FIG. 11A, a boundary 121 is defined along the lower edge of the unstructured grip 120. The cells 122 adjacent the boundary 121 are added as elements to a level set array block.

Figure 11B:
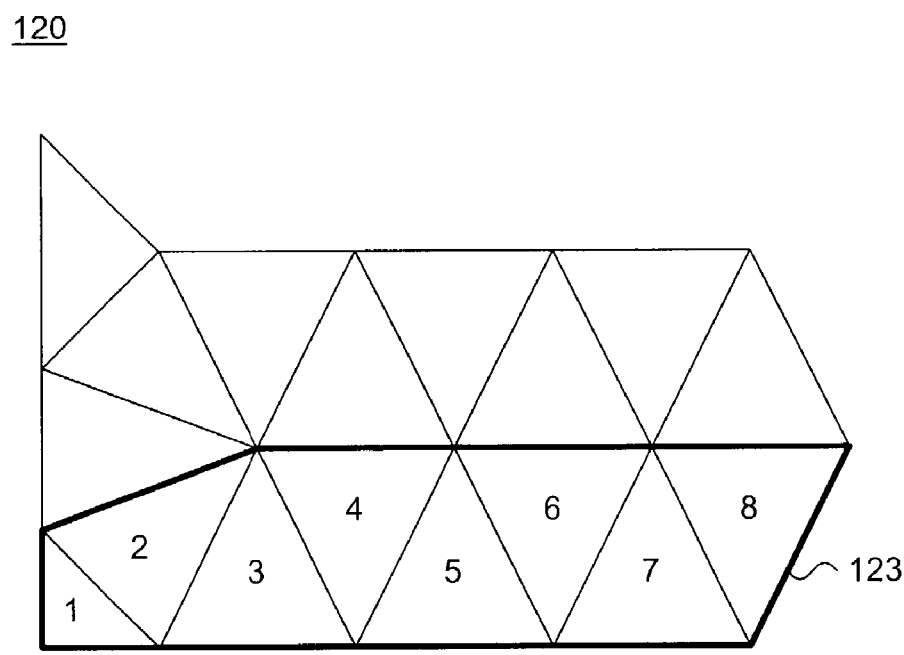

Referring next to FIG. 11B, each cell contiguous to one or more of the added cells 122 is identified and added as elements to the level set array block. The ordering of the added cells is updated progressively as each newly identified contiguous cell is added. As necessary, the elements already added to the level set array block are shifted to make the next contiguous element in the level set array block available. The resulting level set array block 123 contains each of the cells adjacent the boundary 121 and the cells added to make the level set represent a contiguous traversal of cells in the model 121.

Figure 11C:
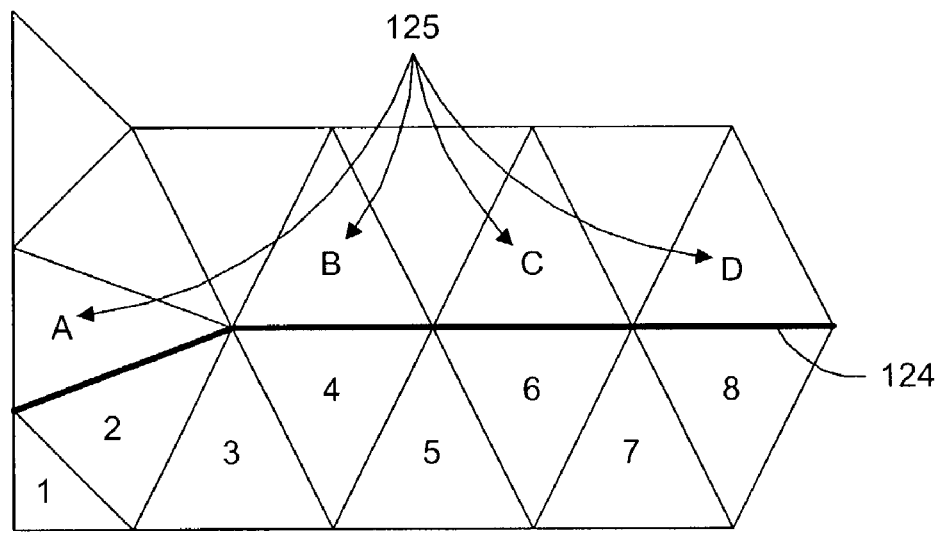

Referring next to FIG. 11C, a further boundary 124 is defined along the edge of the level set array block 123. As before, the cells 125 adjacent to the boundary 124 are added to a second level set array block.

Figure 11D:
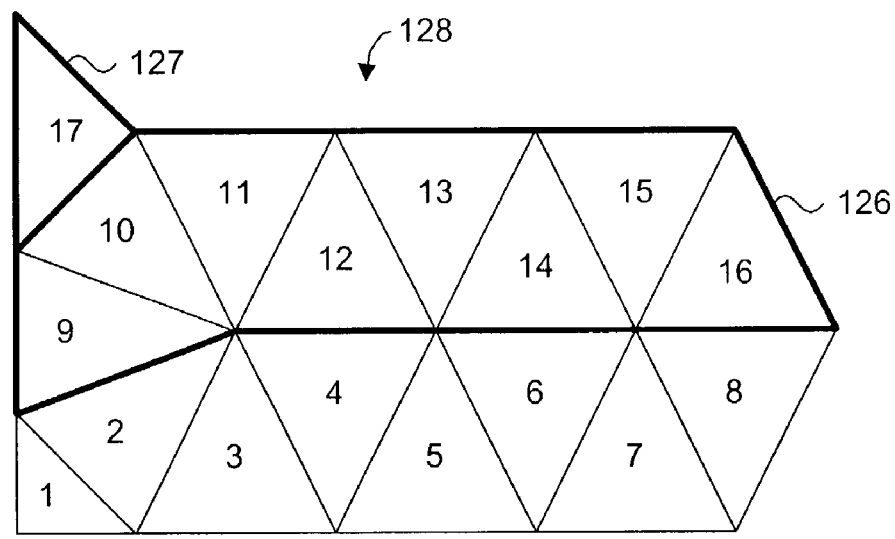

Referring next to FIG. 11D, cells are added to the existing cells in the second level set array block, if required, to make the level set array block a contiguous set of cells. A further boundary is defined and a third level set array block 127 is formed from all remaining cells for reordering.

As before, the ordering of the cells in the second and third level set array blocks 126, 127 is progressively updated as are added such that the level set represents a contiguous set of cells in the model. The final ordering of the cells 128 of the unstructured grid 120 progresses in order of a traversal along each of the successively-defined boundaries 121, 124, thereby resulting in a regular and cache-friendly cell ordering.

Figure 12:
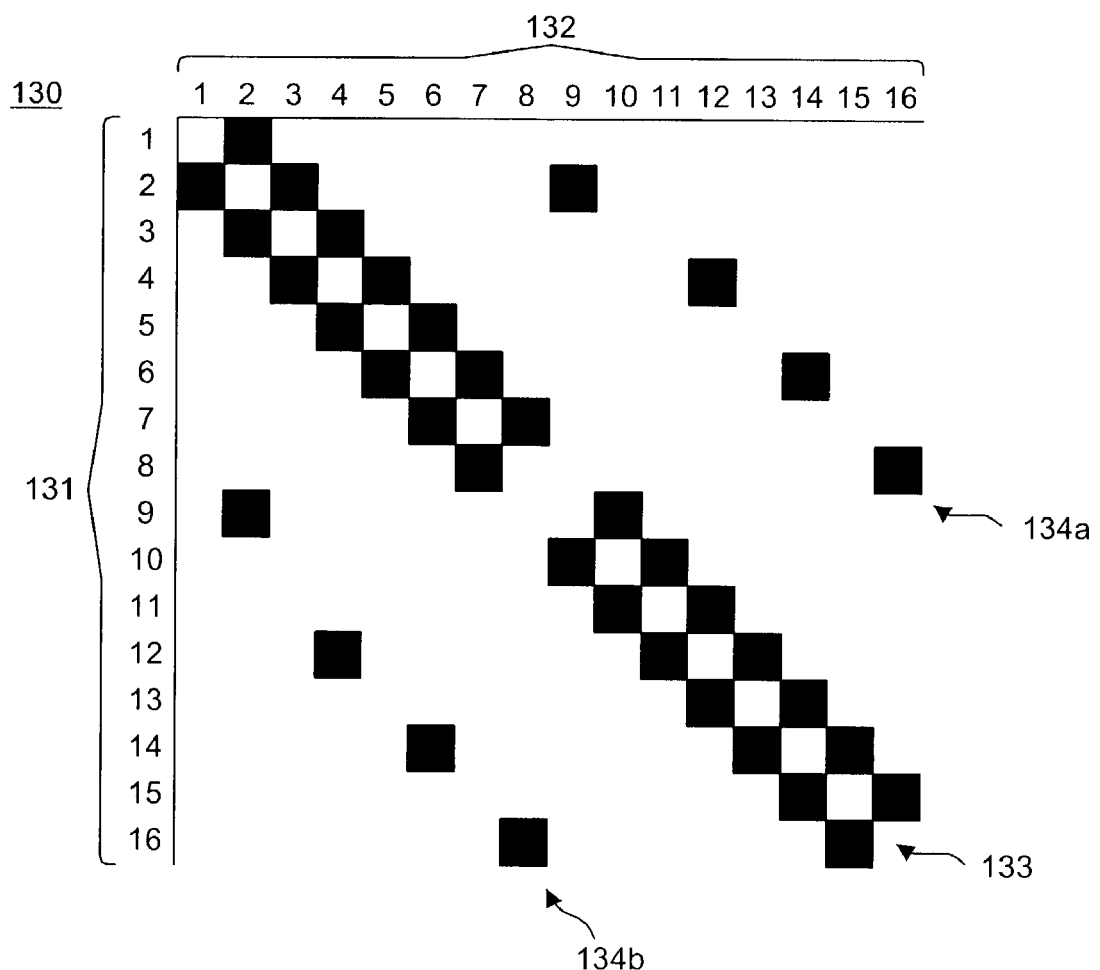
FIG. 12 is a graph showing, by way of example, an adjacency matrix formed from the cells of the unstructured grid of FIG. 11.

FIG. 12 is a graph showing, by way of example, an adjacency matrix formed from the cells 128 of the unstructured grid 120 of FIG. 11D. As above, the adjacency matrix 130 contains a set of rows 131 and columns 132 for the cells 128 of the unstructured grid 120, reflecting, respectively, the nearest neighboring cells. As with the adjacency matrix 60 for a structured grid 50 (shown in FIGS. 5 and 4, respectively), the nearest neighboring cells tend to be clustered in a near-diagonal 133 with two far-diagonals 134*a,b*. The cells in the near-diagonal 133 shows the contiguous nature of cells within a cache line and the cells in the far-diagonals 134*a,b* form a 45° angle, which indicates an approximately constant memory access stride. Both near- and far-diagonal cells exhibit good cache reuse. The near-diagonal cells indicate good cache reusing with the same cache line, and the far-diagonal cells indicate good cache reusing with other cache lines.

Filament Reordering Method

Figure 13:
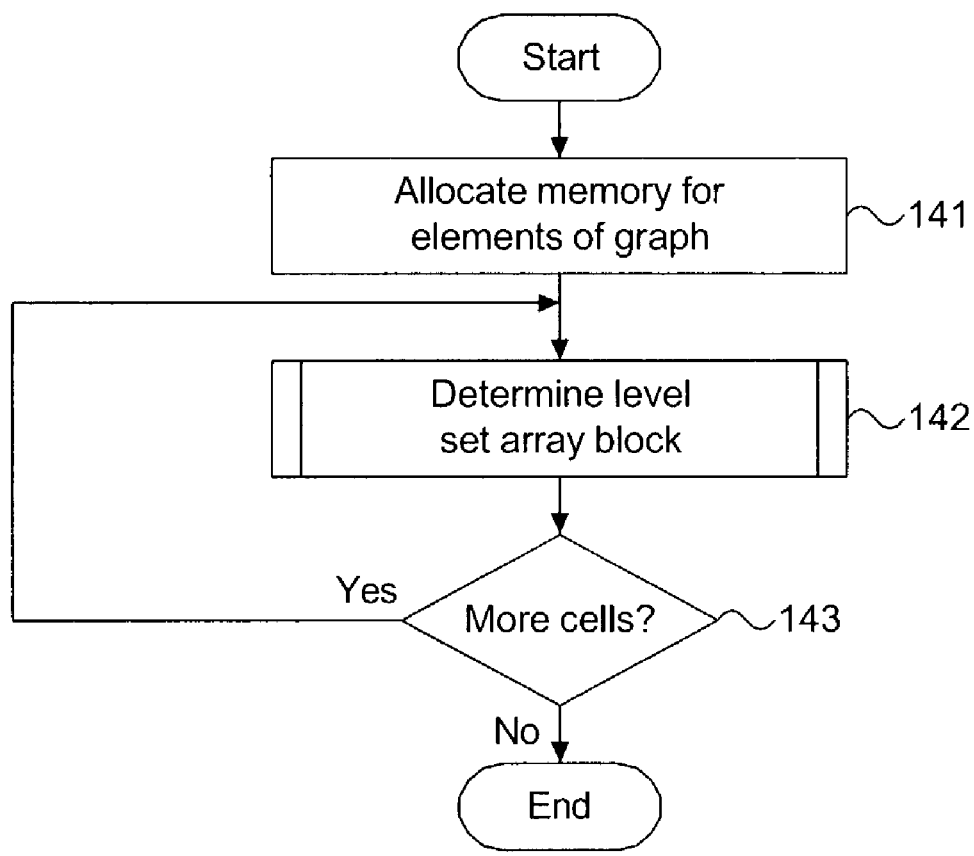
FIG. 13 is a flow diagram showing a method for determining a cache optimized ordering of cells in an unstructured graph in accordance with an embodiment of the present invention.

FIG. 13 is a flow diagram showing a method 140 for determining a cache optimized ordering of cells in an unstructured graph 128 (shown in FIG. 11D) in accordance with an embodiment of the present invention. Briefly, the method operates by loading a graph 41 (shown in FIG. 3) from the attached storage device 13 into memory 27 and reordering the elements of the graph 41, beginning with a first level set array block and followed by successive level set array blocks, until a full reordering is achieved.

Thus, a memory block for temporarily holding the elements of the graph 41 is allocated (block 141). Next, a first level set array block 123 (shown in FIG. 11B) is determined (block 142), as further described below with reference to FIG. 14. Further level set array blocks are determined (block 142), if more cells require reordering (block 143). Finally, the method terminates.

Level Set Array Block Determination

Figure 14:
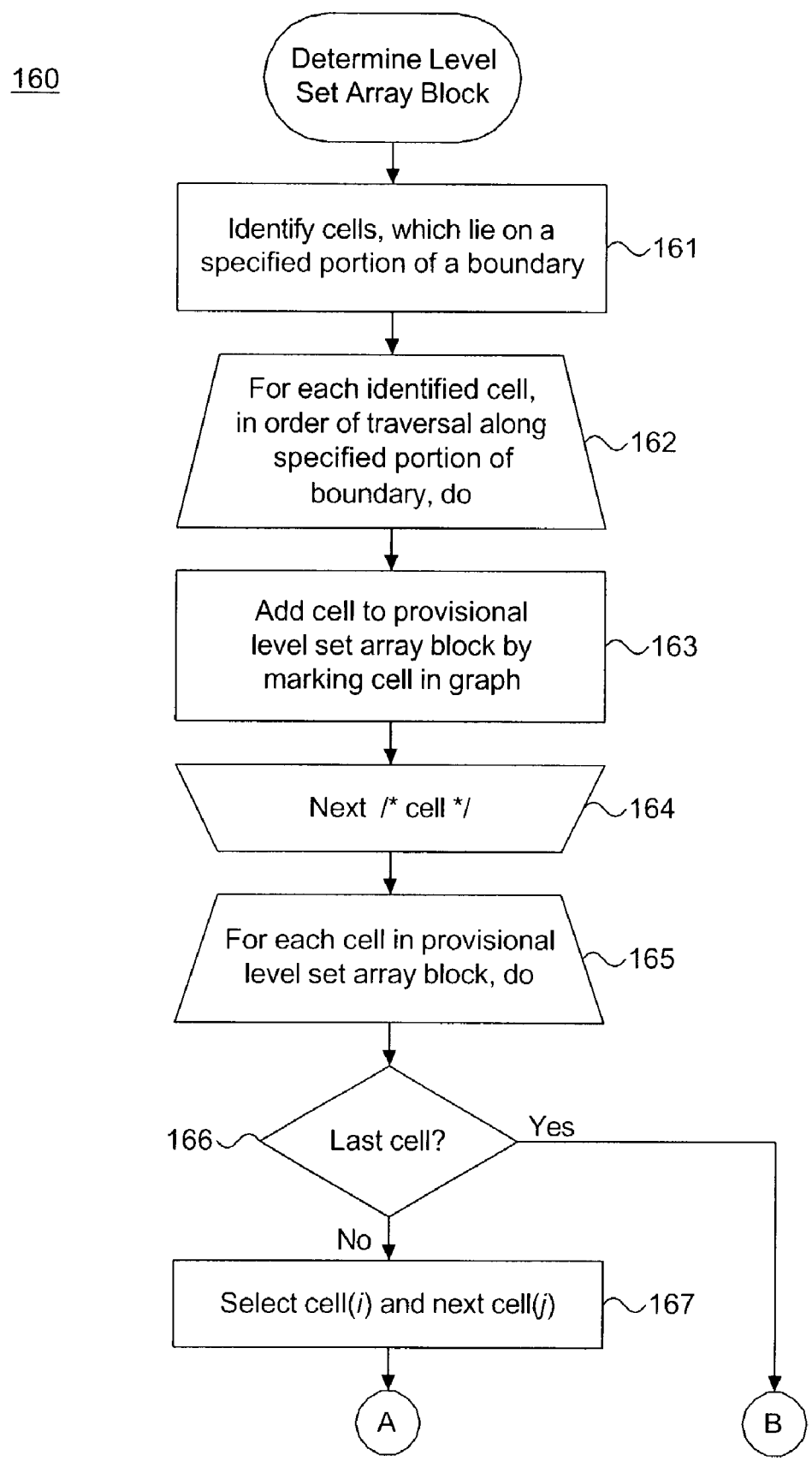
FIG. 14 is a flow diagram showing a routine for determining a level set array block for use in the method of FIG. 13.
Figure 14A:
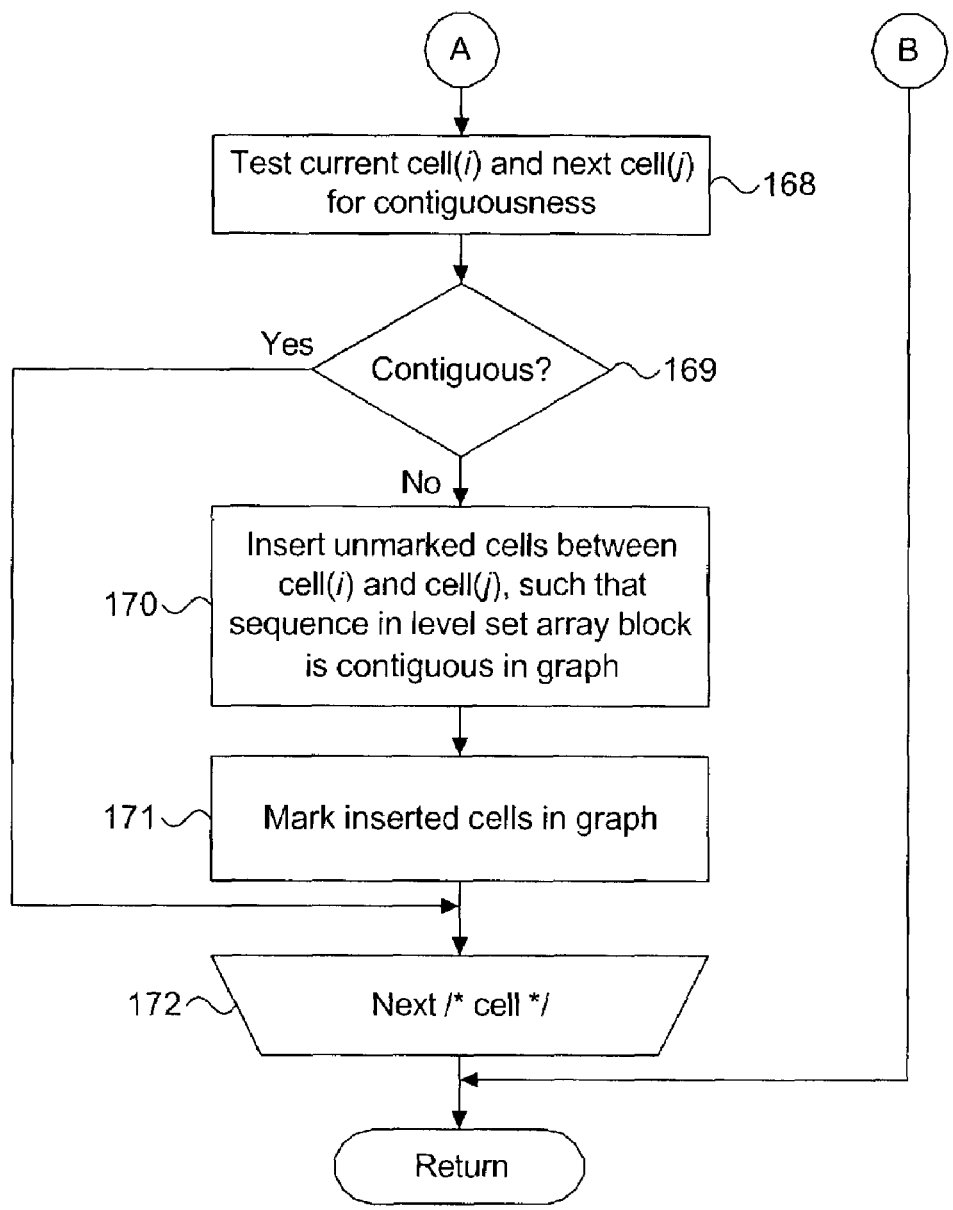

FIG. 14 is a flow diagram showing a routine 160 for determining a level set array block 123 (shown in FIG. 11B) for use in the method of FIG. 13. The purpose of this routine is to create a level set array block 123 based on a portion of a boundary of a graph 41 (shown in FIG. 3).

Thus, the cells, which lie on a specified portion of a boundary of the graph 41 are identified (block 161). In the described embodiment, a boundary is defined by identifying an edge of the graph 41 shared by one or more of the cells. However, the boundary could be any form of identification of contiguously but non-exclusively neighboring cells in the data object.

Each of the identified cells, in order of traversal along the specified portion of the boundary, is iteratively selected and added to a level set array block, as follows (blocks 162-164). For each identified cell (block 162), the cell is added to a provisional level set array block by marking the cell in the graph 41 (block 163). Processing continues with each successive identified cell (block 164).

Next, each cell in the provisional level set array block is iteratively processed in a loop (blocks 165-172), as follows. For each current cell(i) (block 165), if the current cell(i) is the last cell in the provisional level set array block (block 166), no further processing is required and the routine returns. Otherwise, the current cell(i) and the next cell(j) in the provisional level set array block are selected (block 167) and tested for contiguousness in the graph 41 (block 168). If the current cell(i) and the next cell(j) are contiguous (block 169), the loop (blocks 165-172) is cycled. Otherwise, if the current cell(i) and next cell(i) are not contiguous (block 169), unmarked cells are added to the provisional level set array block (block 170), such that the sequence of cells from the current cell(i) to the next cell(j) in the provisional level set array block represent a contiguous sequence of cells in the graph 41. The inserted cells are marked in the graph 41 (block 171) and processing continues with each cell remaining in the provisional level set array block (block 172). Upon completion of the processing of each cell, the routine returns.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system for determining a cache optimized ordering of cells in an unstructured graph, wherein the unstructured graph is a computer-generated file that is loaded from storage into memory, the system comprising:
    a bounding module identifying cells laying on a specified portion of a boundary of a logically-defined grid for the unstructured graph, wherein the unstructured graph comprises a shape having more than two dimensions;
    a reordering module adding each identified cell along the specified portion of the boundary into an element of a provisional level set array block, inserting one or more further cells that lie between each non-contiguous pair of cells in the logically-defined grid into an element of the provisional level set array block, wherein each further cell is contiguous in the logically defined grid to at least one of the cells in the provisional level set array block, and ordering the cells in the provisional level set array block such that traversal through the provisional array results in a traversal through contiguous cells in the logically defined grid for the unstructured graph;
    a searching module finding each additional cell in the unstructured graph that is contiguous in each dimension to the at least one cell added previously to the level set array block; and
    an iteration module repeating the steps of identifying, adding, inserting, and ordering each cell remaining in the logically-defined grid into the provisional level set array block, wherein, upon termination of the iteration, the provisional level set array is a computer-generated file such that the order specified by the provisional level set array block for accessing the cells in the unstructured graph is a regular cell ordering, wherein the ordering ensures increased spatial and temporal data locality resulting in cache-friendly run-time behavior that increases program performance.

2. A system according to claim 1, wherein the unstructured graph comprises a shape having two dimensions.

3. A system according to claim 1, further comprising:
    a preordering module dividing the unstructured graph into the cells with each such cell having a closed shape and sharing a common edge with at least one other such cell in the unstructured graph.

4. A system according to claim 1, further comprising:
    a memory allocation module allocating the level set array block with a set of the elements at least equal to the number of the cells in the unstructured graph.

5. A system according to claim 1, wherein the unstructured graph comprises a polygon logically divided by regularly-spaced cells.

6. A system according to claim 1, wherein the unstructured graph comprises a polygon logically divided by irregularly-spaced cells.

7. A method for determining a cache optimized ordering of cells in an unstructured graph, wherein the unstructured graph is a computer-generated file that is loaded from storage into memory, the method comprising:
    identifying cells laying on a specified portion of a boundary of a logically-defined grid for the unstructured graph, wherein the unstructured graph comprises a shape having more than two dimensions;

adding each identified cell along the specified portion of the boundary into an element of a provisional level set array block;

inserting one or more further cells that lie between each non-contiguous pair of cells in the logically-defined grid into an element of the provisional level set array block, wherein each further cell is contiguous in the logically defined grid to at least one of the cells in the provisional level set array block;

ordering the cells in the provisional level set array block such that traversal through the provisional array results in a traversal through contiguous cells in the logically defined grid for the unstructured graph;

finding each additional cell in the unstructured graph that is contiguous in each dimension to the at least one cell added previously to the level set array block; and repeating the steps of identifying, adding, inserting, and ordering each cell remaining in the logically-defined grid into the provisional level set array block, wherein, upon termination of the iteration, the provisional level set array is a computer-generated file such that the order for accessing the cells in the unstructured graph is a regular cell ordering, wherein the ordering ensures increased spatial and temporal data locality resulting in cache-friendly run-time behavior that increases program performance.

8. A method according to claim 7, wherein the unstructured graph comprises a shape having two dimensions.

9. A method according to claim 7, further comprising:
dividing the unstructured graph into the cells with each such cell having a closed shape and sharing a common edge with at least one other such cell in the unstructured graph.

10. A method according to claim 7, further comprising:
allocating the level set array block with a set of the elements at least equal to the number of the cells in the unstructured graph.

11. A method according to claim 7, wherein the unstructured graph comprises a structured polygon logically divided by regularly-spaced cells.

12. A method according to claim 7, wherein the unstructured graph comprises an unstructured polygon logically divided by irregularly-spaced cells.

13. A computer-readable storage medium holding instructions that when executed by a computer cause the computer to perform a method for determining a cache optimized ordering of cells in an unstructured graph, wherein the unstructured graph is a computer-generated file that is loaded from storage into memory, wherein the computer-readable storage medium includes one of a volatile memory, a non-volatile memory, a disk drive, a magnetic tape, a compact disc, a digital versatile disk, and a digital video disk, the method comprising:

identifying cells laying on a specified portion of a boundary of a logically-defined grid for the unstructured graph, wherein the unstructured graph comprises a shape having more than two dimensions;

adding each identified cell along the specified portion of the boundary into an element of a provisional level set array block;

inserting one or more further cells that lie between each non-contiguous pair of cells in the logically-defined grid into an element of the provisional level set array block, wherein each further cell is contiguous in the logically defined grid to at least one of the cells in the provisional level set array block;

ordering the cells in the provisional level set array block such that traversal through the provisional array results in a traversal through contiguous cells in the logically defined grid for the unstructured graph;

finding each additional cell in the unstructured graph that is contiguous in each dimension to the at least one cell added previously to the level set array block; and repeating the steps of identifying, adding, inserting, and ordering each cell remaining in the logically-defined grid into the provisional level set array block, wherein, upon termination of the iteration, the provisional level set array is a computer-generated file such that the order for accessing the cells in the unstructured graph is a regular cell ordering, wherein the ordering ensures increased spatial and temporal data locality resulting in cache-friendly run-time behavior that increases program performance.

14. A computer-readable storage medium according to claim 13, wherein the unstructured graph comprises a shape having two dimensions.

15. A computer-readable storage medium according to claim 13, further comprising:
dividing the unstructured graph into the cells with each such cell having a closed shape and sharing a common edge with at least one other such cell in the unstructured graph.

16. A computer-readable storage medium according to claim 13, further comprising:
allocating the level set array block with a set of the elements at least equal to the number of the cells in the unstructured graph.

17. A computer-readable storage medium according to claim 13, wherein the unstructured graph comprises a structured polygon logically divided by regularly-spaced cells.

18. A computer-readable storage medium according to claim 13, wherein the unstructured graph comprises an unstructured polygon logically divided by irregularly-spaced cells.

19. An apparatus for determining a cache optimized ordering of cells in an unstructured graph, wherein the unstructured graph is a computer-generated file that is loaded from storage into memory, the apparatus comprising:

means for identifying cells laying on a specified portion of a boundary of a logically-defined grid for the unstructured graph, wherein the unstructured graph comprises a shape having more than two dimensions;

means for adding each identified cell along the specified portion of the boundary into an element of a provisional level set array block;

means for inserting one or more further cells that lie between each non-contiguous pair of cells in the logically-defined grid into an element of the provisional level set array block, wherein each further cell is contiguous in the logically defined grid to at least one of the cells in the provisional level set array block;

means for ordering the cells in the provisional level set array block such that traversal through the provisional array results in a traversal through contiguous cells in the logically defined grid for the unstructured graph;

means for finding each additional cell in the unstructured graph that is contiguous in each dimension to the at least one cell added previously to the level set array block; and means for repeating the steps of identifying, adding, inserting and ordering each cell remaining in the logically-defined grid into the provisional level set array block, wherein, upon termination of the iteration, the provisional level set array is a computer-generated file such that the order for accessing the cells in the unstructured graph is a regular cell ordering, wherein the ordering ensures increased spatial and temporal data locally resulting in cache-friendly run-time behavior that increases program performance.

* * * * *